US006541113B1

(12) United States Patent
Mehos et al.

(10) Patent No.: US 6,541,113 B1
(45) Date of Patent: Apr. 1, 2003

(54) METHODS FOR PREPARING SILICA-COATED CARBON PRODUCTS

(75) Inventors: Gregory Mehos, Westford, MA (US); Hairuo Tu, Burlington, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/359,016

(22) Filed: Jul. 22, 1999

Related U.S. Application Data
(60) Provisional application No. 60/093,984, filed on Jul. 24, 1998.

(51) Int. Cl.[7] .................................................. B32B 5/16
(52) U.S. Cl. ...................... 428/403; 427/215; 427/219; 428/404
(58) Field of Search ................................ 428/403, 404; 427/212, 215, 219

(56) References Cited

U.S. PATENT DOCUMENTS

| | | | |
|---|---|---|---|
| 2,991,201 A | 7/1961 | Joyce | 117/169 |
| 3,317,458 A | 5/1967 | Clas et al. | 260/41.5 |
| 3,390,006 A | 6/1968 | Takewell et al. | 106/288 |
| 3,660,132 A | 5/1972 | Illigen et al. | 106/307 |
| 3,844,809 A | 10/1974 | Murray | 106/307 |
| 3,961,914 A | 6/1976 | Kindig et al. | 44/1 |
| 4,058,483 A | 11/1977 | Henbest | 252/446 |
| 4,211,578 A | 7/1980 | Scott, IV | 106/307 |
| 4,902,537 A | 2/1990 | Yamada et al. | 427/386 |
| 5,151,402 A | 9/1992 | Craw et al. | 502/401 |
| 5,159,009 A | 10/1992 | Wolff et al. | 524/495 |
| 5,368,936 A | 11/1994 | Braunschweig et al. | 428/403 |
| 5,587,107 A | 12/1996 | Schwertfeger et al. | 252/315.6 |
| 5,679,728 A | 10/1997 | Kawazura et al. | 523/215 |
| 5,747,562 A | 5/1998 | Mahmud et al. | 523/215 |
| 5,749,950 A | 5/1998 | Mahmud et al. | 106/316 |
| 5,766,335 A | 6/1998 | Bujard et al. | 106/404 |
| 5,916,934 A | 6/1999 | Mahmud et al. | 523/215 |
| 5,968,243 A * | 10/1999 | Belmont et al. | 106/31.65 |
| 6,110,994 A * | 8/2000 | Cooke et al. | 523/215 |
| 6,197,274 B1 * | 3/2001 | Mahmud et al. | 423/449.2 |

FOREIGN PATENT DOCUMENTS

| | | |
|---|---|---|
| DE | 1054898 | 8/1958 |
| DE | 1943297 | 5/1971 |
| DE | 004123163 A | 1/1992 |
| EP | 0 799 867 A1 | 10/1997 |
| GB | 974880 | 11/1962 |
| GB | 972626 | 8/1963 |
| GB | 1 281 006 | 1/1970 |
| GB | 1 213 186 | 11/1970 |

(List continued on next page.)

OTHER PUBLICATIONS

International Search Report for PCT/US99/16581 dated Nov. 26, 1999.

Primary Examiner—H. Thi Le

(57) ABSTRACT

Methods of making a silica-coated carbon product are described. In one method, an aqueous media or solution and a carbon product are contacted with a solution comprising a silicate substantially free of metal ions, for a sufficient time and temperature to form the silica-coated carbon product. A method of making a silica-coated product by contacting the aqueous media and a carbon product with a solution comprising monosilicic acid is also described as well as exchanging metal ions in a solution comprising metallic silicate for hydrogen ions and contacting an aqueous media and a carbon product with the solution to form silica-coated carbon products. Silica-coated carbon products resulting from these methods are also described and include a plurality of silica-coated products wherein each of the silica-coated products are substantially and uniformly coated with silica and in the substantial absence of free silica. Also, elastomeric compositions and the like containing the silica-coated carbon products are described.

30 Claims, 2 Drawing Sheets

FOREIGN PATENT DOCUMENTS

| | | |
|---|---|---|
| GB | 2 044 741 A | 10/1980 |
| JP | 46669 | 11/1972 |
| JP | 6104786 | 1/1980 |
| JP | 59-112028 | 6/1984 |
| JP | 63-63755 | 3/1988 |
| JP | 63063755 | 3/1988 |
| JP | 3 98613 | 4/1991 |
| JP | 06-173118 | 6/1994 |
| JP | 10025428 | 1/1998 |
| WO | WO 98/13428 | 4/1998 |

\* cited by examiner

US 6,541,113 B1

METHODS FOR PREPARING SILICA-COATED CARBON PRODUCTS

This application is a continuation-in-part of prior U.S. Provisional Application No. 60/093,984 filed Jul. 24, 1998, which is incorporated in its entirety by reference herein.

BACKGROUND OF THE INVENTION

The present invention relates to silica-coated carbon products and methods for making silica-coated carbon products. Preferably, silica is coated onto carbon products, such as carbon black without forming free-standing silica particles. The present invention also provides a means for removing metallic cations during the manufacture of silica-coated carbon products.

Carbon blacks are widely used as pigments, fillers, and reinforcing agents in the compounding and preparation of elastomeric compounds used in the manufacture of tires. They are generally produced in a furnace-type reactor by pyrolyzing a hydrocarbon feedstock with hot combustion gases to produce combustion products containing particulate carbon black. Carbon black exists in the form of aggregates. The aggregates, in turn, are formed of carbon black particles. Carbon blacks are generally characterized on the basis of analytical properties, including, but not limited to, particle size and specific surface area, aggregate size, shape, and distribution, and chemical and physical properties of the surface. The properties of carbon blacks are analytically determined by tests known to those skilled in the art. For example, nitrogen adsorption surface area (measured by ASTM test procedure D3037—Method A) is a measure of specific surface area. Dibutylphthalate absorption of the crushed (CDBP) and uncrushed (DBP) carbon black (measured by ASTM test procedures D3493-86 and D2414-93, respectively), relate to the aggregate structure. The properties of a given carbon black depend upon the conditions of manufacture and may be modified, e.g., by altering temperature, pressure, feedstock, residence time, quench temperature, throughput, and other parameters.

It is generally desirable in the production of tires to employ carbon black containing compounds when constructing the tread and other portions of the tire. For example, a suitable tread compound will employ an elastomer compounded to provide high abrasion resistance and good hysteresis balance at different temperatures. A tire having high abrasion resistance is desirable because abrasion resistance is proportional to tire life. The physical properties of the carbon black can directly influence the abrasion resistance and hysteresis of the tread compound. Generally, a carbon black with a high surface area and small particle size will impart a high abrasion resistance and hysteresis to the tread compound. Carbon black loading also affects the abrasion resistance of the elastomeric compounds. Abrasion resistance increases with increased loading, at least to an optimum point, beyond which abrasion resistance actually decreases.

The hysteresis of an elastomeric compound relates to the energy dissipated under cyclic deformation. In other words, the hysteresis of an elastomeric composition relates to the difference between the energy applied to deform the elastomer and the energy released when it recovers to its initial undeformed state. Hysteresis is characterized by a loss tangent, tan $\delta$, which is a ratio of the loss modulus to the storage modulus (that is, the viscous modulus to the elastic modulus). Tires made with a tire-tread compound having a lower hysteresis measured at higher temperatures, such as 40° C. or higher, will have reduced rolling resistance, which in turn, results in reduced fuel consumption by the vehicle using the tire. At the same time, a tire tread with a higher hysteresis value measured at low temperature, such as 0° C. or lower, will result in a tire with high wet traction and skid resistance which will increase driving safety. Thus, a tire tread compound demonstrating low hysteresis at high temperatures and high hysteresis at low temperatures can be said to have a good hysteresis balance.

Silica is also used as a reinforcing agent (or filler) for elastomers. However, using silica alone as a reinforcing agent for elastomer leads to poor performance compared to the results obtained with carbon black alone as the reinforcing agent. It is theorized that strong filler-filler interaction and poor filler-elastomer interaction account for the poor performance of silica. The silica-elastomer interaction can be improved by chemically bonding the two with a chemical coupling agent such as bis (3-triethoxysilylpropyl) tetrasulfane (TESPT), commercially available as A-1210 from Witco, USA and Si-69 from Degussa AG, Germany. Coupling agents such as TESPT create a chemical linkage between the elastomer and the silica, thereby coupling the silica to the elastomer.

When the silica is chemically coupled to the elastomer, certain performance characteristics of the resulting elastomeric composition are enhanced. When incorporated into vehicle tires, such elastomeric compounds provide improved hysteresis balance. However, elastomer compounds containing silica as the primary reinforcing agent exhibit low thermal conductivity, high electrical resistivity, high density, and poor processibility.

When carbon black alone is used as a reinforcing agent in elastomeric compositions, it does not chemically couple to the elastomer but the carbon black surface provides many sites for interacting with the elastomer. While the use of a coupling agent with carbon black might provide some improvement in performance to an elastomeric composition, the improvement is not comparable to that obtained when using a coupling agent with silica.

One method of improving the properties of carbon black so that its properties can be comparable to those of silica is to coat the carbon black with silica. One method is described in Japanese Unexamined Patent Publication (Kokai) No. 63-63755. The carbon black is dispersed in water, followed by adjusting the pH to 10 to 11, and maintaining the temperature to at least 70° C. During that time, a diluted sodium silicate solution is added. Then by reducing the pH to 6.5 to 7, the sodium silicate is made to hydrolyze, causing amorphous silica to adhere to or deposit on the surface of the particles of carbon black. The slurry is then filtered and the coated carbon black particles are washed in an attempt to remove dissolved sodium. The silica-coated blacks are then dried. U.K. Patent No. 972,626 and U.S. Pat. No. 5,679,728 state that such silica-coated carbon blacks can be used in rubber formulations.

A disadvantage of such a method for making a silica coated carbon black is the likelihood of forming free-standing particles of silica. Sodium silicate solutions contain both silicic acid and silica particles, mostly 2–3 nm in diameter, but some as large as 5–10 nm in diameter. As the pH is reduced, there is a tendency for larger silica particles to become even larger and small particles to disappear. Hence, there is a high probability that in addition to silica coated carbon black, there is a large number of free-standing silica particles. Free-standing silica is undesirable because filler-filler interactions in rubber compounds will be high which causes a deterioration of performance of tire-tread compounds.

Another disadvantage of the method described by Kokai No. 63-63755 is that the silica-coated carbon black must be filtered and washed in an attempt to remove dissolved sodium, which is in the form of disodium oxide ($Na_2O$) or sodium hydroxide (NaOH), both of which are corrosive. Owing to its small particle size, carbon black slurries are difficult to filter, and filtration steps to isolate the silica-coated carbon black are time-consuming and costly.

SUMMARY OF THE PRESENT INVENTION

In one embodiment of the present invention, the present invention relates to a method of making a silica-coated carbon product. The method comprises contacting an aqueous media and a carbon product with a solution comprising a silicate substantially free of metal ions, for a sufficient time and temperature to form the silica-coated carbon product. Preferably, the aqueous media is an aqueous slurry containing the carbon product.

In another embodiment of the present invention, the present invention relates to a method of making a silica-coated carbon product by contacting an aqueous media and a carbon product with a solution comprising monosilicic acid, for a sufficient time and temperature to form a silica-coated carbon product.

The present invention also relates to a method of making a silica-coated carbon product, comprising exchanging metal ions in a solution comprising metallic silicate for hydrogen ions and contacting an aqueous media and a carbon product with the solution for a sufficient time and at a sufficient temperature to form a silica-coated carbon product.

Also, the present invention relates to a plurality of silica-coated carbon products, wherein each silica-coated carbon product is substantially and uniformly coated with silica, and the plurality of silica-coated products are in the substantial absence of free silica and/or metal ions.

It is to be understood that both the foregoing general description and the following detailed description are exemplary and explanatory only and are intended to provide further explanation of the present invention, as claimed.

DETAILED DESCRIPTION OF THE PRESENT INVENTION

Figure 1:
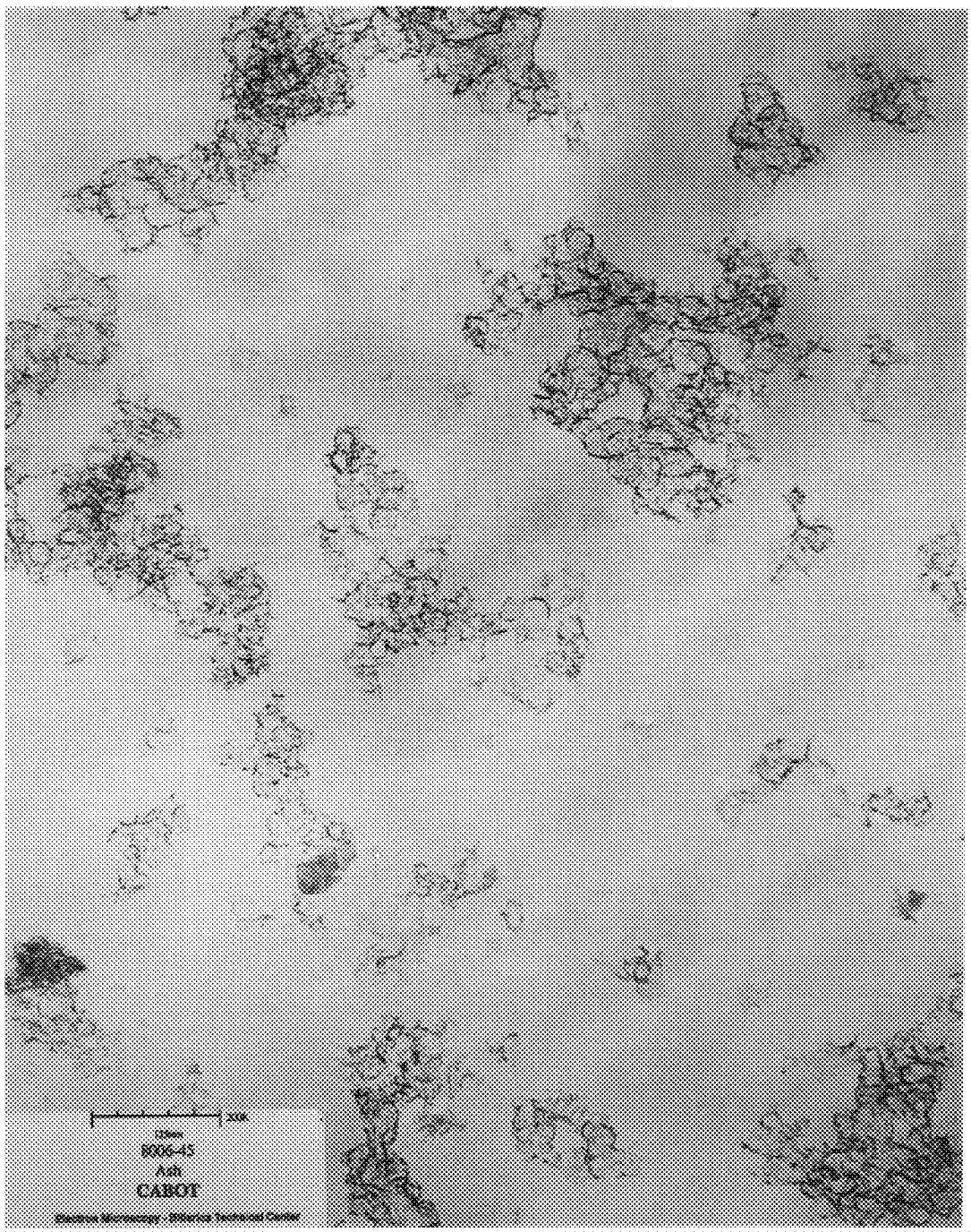
FIG. 1 is a microphotograph of an ashed silica-coated carbon black magnified 200,000 times.

In general, the present invention relates to methods of making a silica-coated carbon product and further relates to silica-coated carbon products which preferably provide a more uniform coating of silica onto the carbon product, preferably in the substantial absence of free silica.

For purposes of the present invention, the carbon product can be carbon black, graphite powder, a graphite fiber, a carbon fiber, a carbon cloth, a vitreous carbon product, and an activated carbon product, such as activated carbon, activated charcoal, and mixtures thereof.

Finely divided forms of the above are preferred. Preferably, the carbon product is carbon black. The carbon product, for purposes of the present invention, can also be an aggregate comprising a carbon phase and a silicon-containing species phase as described in U.S. application Ser. Nos. 08/446,141 and 08/446,142, and PCT Publication No. WO 96/37547, all of which are incorporated in their entirety by reference herein. The carbon product, for purposes of the present invention, can also be an aggregate comprising a metal-containing species phase and a carbon phase such as those described in U.S. application Ser. No. 08/828,785, which is incorporated in its entirety by reference herein.

Any of the carbon products can have one or more attached organic groups onto the carbon product. Examples of such organic groups include organic groups comprising an aromatic group or a $C_1$–$C_{12}$ alkyl group which are preferably directly attached onto the carbon product. Organic groups which promote the water dispersibility of the carbon product are especially preferred, such as organic groups comprising an aromatic group with an ionic or ionizable group. Specific examples of such ionic and ionizable groups include, but are limited to, sulfonic acid group or a salt thereof, sulfinic acid group or a salt thereof, carboxylic acid group or a salt thereof, a phosphonic acid group or a salt thereof, or a quaternary ammonium or phosphonium group. Specific examples of organic groups are described in PCT Publication Nos. WO 96/18696, WO 96/18688, and WO 96/18695, and U.S. Pat. Nos. 5,554,739, 5,571,311, 5,630,868; 5,672, 198; 5,707,432; 5,713,988; 5,803,959; 5,895,522; 5,885, 335; 5,851,280; and 5,698,016, all of which are incorporated in their entirety by reference herein.

When the silica-coated carbon product, such as carbon black, is to be used in tire applications, such as in a tire tread formulation, it is preferred that the carbon product be a carbon black and have a nitrogen surface area of from about 90 to about 250 $m^2/g$ and an external surface area or t-area of from about 90 to about 150 $m^2/g$. The t-area is determined following the sample preparation and measurement procedure described in ASTM D3037 —Method A for nitrogen surface area. For this measurement, the nitrogen adsorption isotherm is extended up to 0.55 relative pressure. The relative pressure is the pressure (P) divided by the saturation pressure ($P_0$) (the pressure at which the nitrogen condenses). The adsorption layer thickness ($t_L$) is then calculated using the relation:

$$t_L = \frac{13.99}{\sqrt{0.034 - \log\left(\frac{P}{P_0}\right)}}$$

The volume of nitrogen adsorbed is then plotted against $t_L$. A straight line is then fit through the data points for values between 3.9 and 6.2 Angstroms. The t-area is obtained from the slope of the line as follows:

t-area ($m^2/g$)=15.47*slope

The carbon black preferably has a DBP absorption of from about 90 to about 180 ml/100 g. While the ranges of nitrogen surface area and t-area are representative of carbon blacks that are used for tire-tread compounds, the invention is not limited to carbon black fillers with these specifications.

For purposes of the present invention, the carbon product can generally have any nitrogen surface area, parameter, and/or external surface area or t-area.

With respect to the methods of making the silica-coated carbon products of the present invention, aqueous media (e.g., water) and a carbon product are brought into contact with a solution containing at least a silicate, wherein the silicate is substantially free of metal ions. The aqueous media and carbon product are brought into contact with the solution containing the silicate for a sufficient time and at a sufficient temperature to form the silica-coated carbon products of the present invention. The aqueous media can contain the carbon product and thus be in the form of an aqueous slurry. With respect to the aqueous slurry, any amount of carbon product can be present so long as an aqueous slurry is maintained. Preferably, from about 1% to about 20% by weight of a carbon product can be present in the aqueous slurry, and more preferably from about 2% to about 7% by weight, and most preferably about 5% by weight of a carbon product can be present in the aqueous slurry with the remaining percentage being water or an aqueous-based liquid.

As indicated above, the aqueous media and carbon product can be separately added or brought into contact with the solution containing the silicate. For instance, the carbon product can be placed in a pelletizer and water can be added separately. Further, the solution containing the silicate can also be added at any time. In such a method, the amount of the carbon product can be any amount as long there is a sufficient aqueous media, such as water, in order to permit the coating of the carbon product with the solution containing the silicate. For instance, amounts up to 50% by weight carbon black, based on the weight of all of the components present, can be used in such a pelletizing operation. The amounts of water typically used with pelletizing of carbon products can be sufficient to form the silica-coated carbon products of the present invention once the solution containing the silicate is added. Typical amounts can include from about 100 to about 150 parts water per 100 parts carbon product.

Besides the carbon product, other ingredients can be present in the aqueous slurry such as dispersants, surfactants, stabilizers, and buffering agents. The various optional ingredients can be present in conventional amounts and the presence of a surfactant can assist in making the carbon product more dispersible in the aqueous media for purposes of obtaining a uniform coating of silica on the carbon product. The presence of a surfactant may not be necessary if a carbon product is being used which contains or has an organic group attached thereto which makes the carbon product sufficiently dispersible in the aqueous media for purposes of the present invention.

For purposes of the present invention, the temperature of the aqueous media, and preferably slurry can be any temperature which permits silica to form and coat onto the carbon product. Preferably, the temperature of the aqueous media and the carbon product is at least 70° C., and more preferably is from about 70° C. to about 100° C., and most preferably is from about 80° C. to about 85° C. Furthermore, while the aqueous media or slurry can have any pH, it is preferred that the aqueous media or slurry have a pH of from about 4 to about 10, and more preferably from about 4 to about 7. The pH of the aqueous media or slurry can be adjusted to any desired pH with the use of a base or acid as is known to those skilled in the art. Preferably, an acid or base free of metal components is used for controlling pH, such as ammonia based compounds.

The silicate which is substantially free of metal ions generally has less than about 750 ppm metal ions, and preferably about 500 ppm or less, and even more preferably from about 10 ppm to about 350 ppm, and most preferably negligible or no metal ions present. Preferably, the silicate is a silicic acid which may also include ionic silicon-containing species such as $HSiO_3^-$ and $SiO_3^{2-}$. Other forms of silicon-containing species can also be present. Preferably, the silicate is a monosilicic acid. Also, generally water can be present as part of the solution containing the silicate.

The solution containing the silicate which is substantially free of metal ions can be prepared a number of ways. Preferably, in a separate vessel, a metallic silicate, such as sodium silicate or potassium silicate is brought into contact with a strong acid-cationic exchange resin which will exchange the metallic cations from the silicate leaving the silica in the form of a silicate having substantially no metal ions present, such as in the form of a monosilicic acid and/or ionic species thereof. Essentially, the strong acid-cation exchange resin exchanges the metallic ions for hydrogen ions.

Preferably, the metallic silicate is a water-soluble metallic silicate and more preferably is sodium silicate or potassium silicate. Further, it is preferred that the metallic silicate contains silicon dioxide ($SiO_2$) from about 1% to about 30% by weight and more preferably from about 3% to about 5% by weight. Also, it is preferred that the silicon dioxide-disodium oxide ratio be about 3.2 or less and more preferably less than about 2.5 which can be achieved by using a base, such as ammonia or sodium hydroxide, which also leads to the solution comprising the silicate to have a pH of greater than about 12 and more preferably about 12.5. When such conditions are reached, a majority of the polysiloxane species in the solution containing the silicate will preferably disappear and the solution will contain silicic acid ($Si(OH)_4$) and ionic silicon-containing species which include $HSiO_3^-$ and $SiO_3^{2-}$. Generally, with such preferred conditions, essentially all of the silicon will be in a monomeric form. In another embodiment of the present invention, polysiloxanes are present which can lead to the formation of a mixture of a silica-coated carbon product in combination with silica, which can have certain beneficial properties.

Examples of suitable cationic exchange resins include, but are not limited to, HGR-W2 Dowex by Dow Chemical Company, USA, and Amberlite by Rohm and Haas Company, USA. During the cationic exchange, as more metallic ions are exchanged with hydrogen ions, the pH of the silicate is reduced thereby eliminating ionic silica species and forming additional monosilicic acid. Generally, the solution of monosilicic acid formed by this method is supersaturated and will form polysiloxane silica by condensation or precipitation onto a surface. Accordingly, the supersaturated monosilicic acid is in a form that will advantageously coat the carbon product with silica on the surface of the carbon product.

It is preferred to substantially remove or eliminate the polysiloxane species which may be present in the solution containing the metallic silicate prior to contacting the solution with a strong acid-cationic exchange resin.

Also, for purposes of the present invention, the metallic silicate solution and the aqueous media or slurry containing the carbon product can be simultaneously passed through the ion exchange resin or alternatively, the metallic silicate solution can be separately passed through an ion exchange resin and then brought into contact with the aqueous media or slurry containing the carbon products. The manner in which the aqueous media or slurry containing the carbon products is brought into contact with the solution comprising the silicate substantially free of metal ions can be done in any manner, such as mixing the aqueous media or slurry with the solution together by stirring or other mechanical means or any other means of bringing two solutions into contact with each other.

With the method of the present invention, the morphology of the silica coating the carbon product can be controlled by controlling the pH of the aqueous media or slurry containing the carbon product. For instance, if the pH of the aqueous media or slurry is about 7 or lower, the silica will generally be in the form of a thin coating totally or partially coating the carbon product. On the other hand, if the pH of the aqueous media or slurry is 7 or greater, the silica will generally be in the form of small particles that aggregate around the carbon product, for instance, particles having a size of from about 5 to about 10 mm and more preferably from about 7 to about 8 mm in size. In either case, the silica coating the carbon product is substantially uniform in nature and generally avoids any free silica particles that are the same size as the carbon products present and more preferably avoids or substantially avoids the presence of any free silica particles.

With the methods of the present invention, the silica-coated carbon products are preferably free of metal ions such as sodium and thus avoids any necessary washing step to remove the metal ions. The silica-coated carbon products once formed can be removed from the aqueous media or slurry by any isolation means such as filtration followed by drying or the slurry can be feed into a spray dryer to separate the silica-coated carbon products from the water.

Any suitable elastomer may be compounded with the silica-coated carbon products to provide elastomeric compounds. Such elastomers include, but are not limited to, homo- or co-polymers of 1,3 butadiene, styrene, isoprene, isobutylene, 2,3-dimethyl-1,3-butadiene, acrylonitrile, ethylene, and propylene Preferably, the elastomer has a glass transition temperature (Tg) as measured by differential scanning colorimetry (DSC) ranging from about—120° C. to about 0° C. Examples include, but are not limited, styrene-butadiene rubber (SBR), natural rubber, polybutadiene, polyisoprene, and their oil-extended derivatives. Blends of any of the foregoing may also be used.

Among the rubbers suitable for use with the present invention are natural rubber and its derivatives such as chlorinated rubber. The silica-coated carbon products may also be used with synthetic rubbers such as: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl 2- vinylpyridine, 5-ethyl-2-vinylpyridine, 2-methyl-5-vinylpyridine, alkyl-substituted acrylates, vinyl ketone, methyl isopropenyl ketone, methyl vinyl either, alphamethylene carboxylic acids and the esters and amides thereof such as acrylic acid and dialkylacrylic acid amide; also suitable for use herein are copolymers of ethylene and other high alpha olefins such as propylene, butene-1 and pentene-1.

The rubber compositions of the present invention can therefore contain an elastomer, curing agents, reinforcing filler, a coupling agent, and, optionally, various processing aids, oil extenders, and antidegradents. In addition to the examples mentioned above, the elastomer can be, but is not limited to, polymers (e.g., homopolymers, copolymers, and terpolymers) manufactured from 1,3 butadiene, styrene, isoprene, isobutylene, 2,3-dimethyl-1,3 butadiene, acrylonitrile, ethylene, propylene, and the like. It is preferred that these elastomers have a glass transition point (Tg), as measured by DSC, between −120° C. and 0° C. Examples of such elastomers include poly(butadiene), poly(styrene-co-butadiene), and poly(isoprene).

Elastomeric compositions disclosed in the present invention include, but are not limited to, vulcanized compositions (VR), thermoplastic vulcanizates (TPV), thermoplastic elastomers (TPE) and thermoplastic polyolefins (TPO). TPV, TPE, and TPO materials are further classified by their ability to be extruded and molded several times without loss of performance characteristics.

The elastomeric compositions may include one or more curing agents such as, for example, sulfur, sulfur donors, activators, accelerators, peroxides, and other systems used to effect vulcanization of the elastomer composition.

The resultant elastomeric compounds containing the silica-coated carbon products of the present invention and optionally containing one or more coupling agents may be used for various elastomeric products such as a tread compound, undertread compound, sidewall compound, wire skim compound, innerliner compound, bead, apex, any compound used in carcass and other components for vehicle tires, industrial rubber products, seals, timing belts, power transmission belting, and other rubber goods.

The present invention will be further clarified by the following examples, which are intended to be purely exemplary of the present invention.

EXAMPLES

Example 1

To a 2-L glass vessel equipped with a mechanical stirrer and heating mantel were added 380 g deionized (DI) water. The agitator was turned on, and the water was heated to 80–85° C. Twenty grams of fluffy carbon black having a t-area of 135 $m^2/g$ and a crushed DBP of 106 ml/100 g were then carefully added to make a slurry of carbon black containing 5% by weight carbon black and 95% by weight water.

In a separate glass vessel were added 14.4 g sodium silicate solution (Sodium Silicate N made by PQ Corporation, USA) containing 28.7% $SiO_2$ and 8.9% $Na_2O$ by weight. The silicate solution was then diluted with 165 g DI water. To remove the polysiloxane molecules from the solution, the pH was raised to 12.6 by adding 3.8 g NaOH.

Two ion-exchange columns were prepared by placing 110 ml of HGR-W2 Dowex resin in each of two 19 mm diameter glass columns. Using a Masterflex peristaltic pump, the dilute silica solution was then pumped through the strong-acid cation exchange column at a rate equal to 7 g/min. After five minutes, the silica feed was discontinued, and DI water was fed into the column at a rate equal to 7 g/min for five minutes. The dilute silica solution and DI water were alternately fed in such a manner until half the silica solution had been fed, after which the procedure was repeated using the second strong-acid cation-exchange column. As the silicic acid from the ion-exchange column was added to the carbon-black slurry, the pH of the silica-coated carbon-black slurry fell from 7 to about 4.7

When all the silica had passed through the cation resin, the slurry containing silica-coated carbon black particles was heated and stirred an additional two hours. The slurry was then filtered, and the wet silica-coated carbon-black particles were oven-dried.

The t-area of the silica-coated carbon black was measured to equal 122 $m^2/g$, the reduction in surface area owing to the fact that the original carbon black particles were now coated with silica and therefore larger with less specific surface area.

A sample of silica-coated carbon black was placed in a high-temperature oven for twelve hours which left an ash composed only of silica and no carbon. The ashed sample was examined using a JEOL-JEM-1200EX microscope. FIG. 1 shows a portion of the ashed sample magnified 200,000 times. The images show curved edges having a 15-nm radius as evidence that the silica was present as a coating of the carbon black particles before the sample was ashed. The nitrogen surface area of the ash was measured and found to equal 631 $m^2/g$, suggesting a very small characteristic diameter on the order of 4 nanometers.

A 5-g sample of silica-coated carbon black was extracted with 100 ml of 10% v/v HF for 1 hour. The silicon content and nitrogen surface area and t-area were measured before and after the HF treatment. The results are shown in Table 1.

TABLE 1

| | HF Treatment | |
|---|---|---|
| Sample | t-area ($m^2/g$) | Nitrogen Surface Area ($m^2/g$) |
| Original silica-coated carbon black | 122 | 198 |
| HF-treated silica-coated carbon black | 132 | 186 |

The data in Table 1 show that the 5-area of the filler particles decreased when the silica is removed. The data are evidence that a silica-coated carbon black having a larger diameter and less specific surface area was made. The nitrogen surface area decreased slightly showing that the silica-coated carbon black filler had greater porosity than the original silica-free carbon-black filler.

Example 2

A second sample of silica-coated carbon black was prepared in the same manner as in Example 1 except that before the monosilicic acid was fed to the carbon-black solution, the pH of the original carbon black slurry was adjusted to 10 using a dilute NaOH solution. As the silicic acid was added to the carbon black slurry, small amounts of NaOH solution were added to maintain the pH of the slurry between 7 to 10. The silica-coated carbon black made by this method was then rinsed with DI water and dried in an oven.

Figure 2:
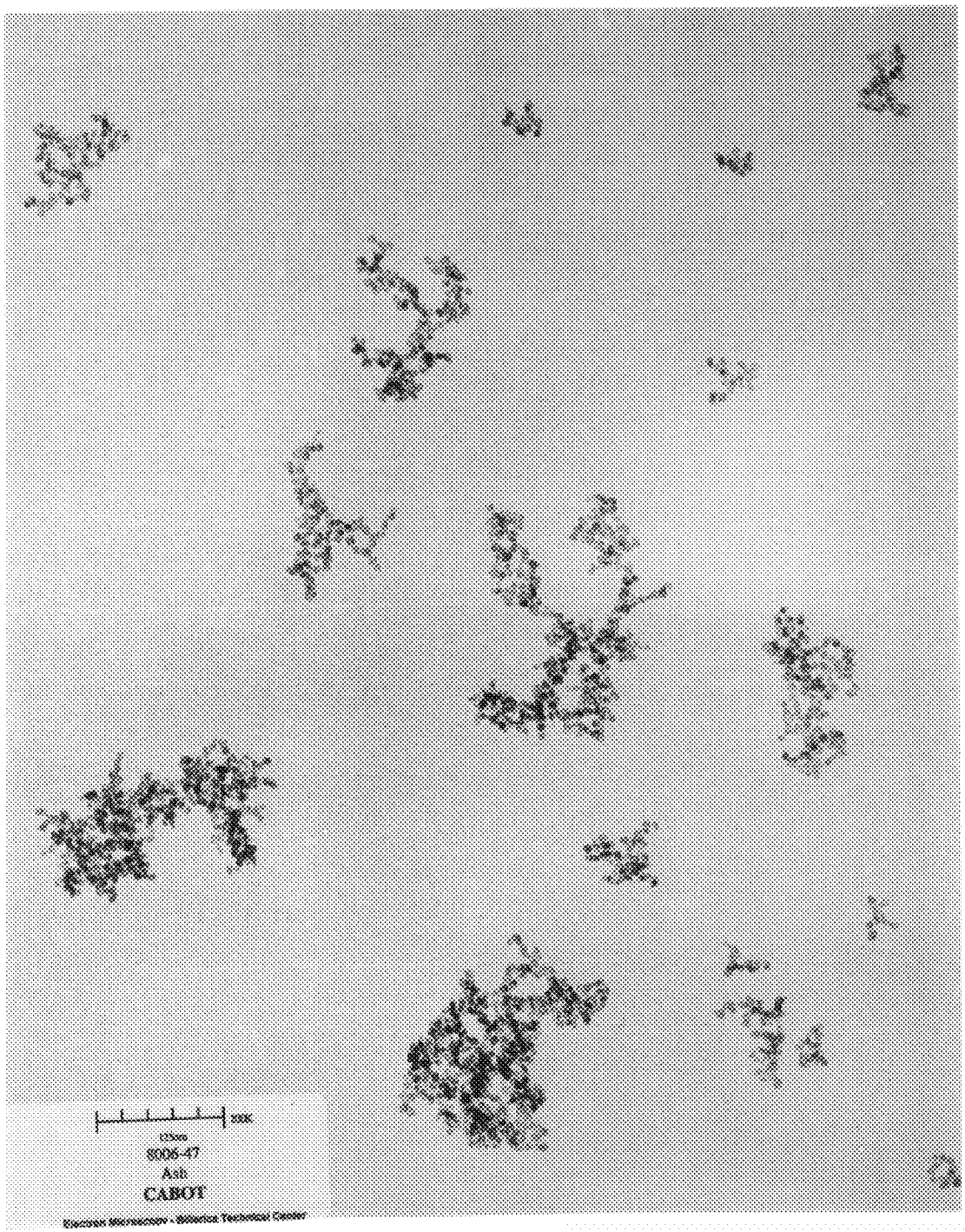
FIG. 2 is a microphotograph showing an ashed sample of a second silica-coated carbon black magnified 200,000 times.

A sample of the second silica-coated carbon black was ashed and examined under the microscope. FIG. 2 shows a portion of the ashed sample magnified 200,000 times. The images show aggregates of silica ca. 8 mm in diameter as evidence that the silica had coated the much larger carbon black as aggregates. The nitrogen surface area of the ash was measured and found to equal 353 $m^2/g$, suggesting a very small characteristic diameter on the order of 8 nanometers.

A 5-g sample of the silica-coated carbon black was extracted with 100 ml of 10% v/v HF for 1 hour. The silicon content and nitrogen surface area and t-area were measured before and after the HF treatment. The results are shown in Table 2.

TABLE 2

| | HF Treatment | |
|---|---|---|
| Sample | t-area ($m^2/g$) | Nitrogen Surface Area ($m^2/g$) |
| Original silica-coated carbon black | 175 | 220 |
| HF-treated silica-coated carbon black | 131 | 185 |

The data in Table 2 show that the surface area of the filler particles increase when the silica is removed. The data are evidence that a macroporous filler whose pores are formed from adjacent silica particles.

Many variations of the present invention will suggest themselves to those skilled in the art in light of the above detailed disclosure. For example, the method can be used to make coated carbon blacks suitable for pigments, toners, and the like. All modifications are within the intended scope of the claims.

Other embodiments of the present invention will be apparent to those skilled in the art from consideration of the specification and practice of the present invention disclosed herein. It is intended that the specification and the examples be considered as exemplary only, with a true scope and spirit invention being indicated by the following claims.

What is claimed is:

1. A method of making a silica-coated carbon product, comprising contacting for a sufficient time and temperature, an aqueous media and a carbon product with a solution comprising a silicate to form the silica-coated carbon product, wherein said solution is substantially free of metal ions, and wherein said solution is formed by passing a solution comprising a metallic silicate through a strong acid-cation exchange resin.

2. The method of claim 1, wherein said carbon product is carbon black, graphite powder, a graphite fiber, a carbon fiber, a carbon cloth, a vitreous carbon product, an activated carbon product, an activated charcoal product, or mixtures thereof.

3. The method of claim 1, wherein the carbon product is carbon black.

4. The method of claim 1, wherein said carbon product is an aggregate comprising a carbon phase and a silicon-containing species phase.

5. The method of claim 1, wherein said carbon product is an aggregate comprising a carbon phase and a metal-containing species phase.

6. The method of claim 1, wherein said carbon product has attached at least one organic group.

7. The method of claim 1, wherein said carbon product has attached at least one organic group substituted with an ionic or ionizable group.

8. The method of claim 1, wherein said carbon product has attached at least one organic group comprising an aromatic group or a $C_1$–$C_{12}$ alkyl group optionally substituted with an ionic or ionizable group, wherein said aromatic group or $C_1$–$C_{12}$ alkyl group is directly attached to the carbon product.

9. The method of claim 8, wherein said carbon product is carbon black.

10. The method of claim 1, wherein said aqueous media and carbon product are in the form of an aqueous slurry comprising the carbon product.

11. The method of claim 10, wherein said aqueous slurry further comprises a surfactant, a buffering agent, or both.

12. The method of claim 10, wherein said aqueous slurry has a pH of about 7 or lower.

13. The method of claim 10, wherein the aqueous slurry has a pH of 7 or above.

14. The method of claim 10, wherein from about 1% to about 20% by weight carbon product is present in the aqueous slurry.

15. The method of claim 10, wherein about 5% by weight carbon product is present in the aqueous slurry.

16. The method of claim 1, wherein said temperature of the aqueous media and solution once combined is at least about 70° C.

17. The method of claim 1, wherein said pH of the solution comprising a metallic silicate is at least about 12.

18. The method of claim 1, further comprising isolating the silica-coated carbon product from the aqueous media.

19. The method of claim 1, wherein said metallic silicate comprises from about 1 to about 30 weight percent $SiO_2$.

20. The method of claim 1, wherein said solution comprising a metallic silicate has a silicon dioxide-disodium oxide ratio of less than about 2.5.

21. The method of claim 1, wherein said solution comprising a metallic silicate has a silicon dioxide-disodium oxide ratio of about 3.2 or less.

22. The method of claim 1, wherein said silica-coated carbon products are partially coated.

23. The method of claim 1, wherein said silica-coated carbon products are fully coated with silica.

24. The method of claim 1, wherein said carbon product, the aqueous media, and said solution are added together or separately in a pelletizer.

25. The method of claim 24, wherein said carbon product is present in an amount of from about 1% to about 50% by total weight.

26. A method of making a silica-coated carbon product, comprising contacting an aqueous media and a carbon product with a solution comprising monosilicic acid, for a sufficient time and temperature to form the silica-coated carbon product.

27. A method of making a silica-coated carbon product, comprising exchanging metal ions in a solution comprising metallic silicate for hydrogen ions and contacting an aqueous media and a carbon product with said solution for a sufficient time and temperature to form a silica-coated carbon product.

28. The method of claim 27, wherein said exchanging of metal ions occurs simultaneously with the contacting of the aqueous media with the said solution.

29. A plurality of silica-coated carbon products, wherein each silica-coated carbon product is substantially and uniformly coated with silica, and in the substantial absence of free silica.

30. The plurality of silica-coated carbon products of claim 29, wherein the silica-coated carbon products are in the substantial absence of metal ions.

* * * * *